United States Patent [19]
Priestley

[11] 4,083,929
[45] Apr. 11, 1978

[54] BENEFICIATION OF PHOSPHATE ROCK

[75] Inventor: Robert Joseph Priestley, Westport, Conn.

[73] Assignee: Dorr-Oliver Incorporated, Stamford, Conn.

[21] Appl. No.: 423,880

[22] Filed: Dec. 12, 1973

[51] Int. Cl.² .......................... C01F 1/00; C01F 5/00; C01F 11/00; C22B 26/20
[52] U.S. Cl. .............................. 423/167; 423/DIG. 16
[58] Field of Search .................... 423/167, 659 F, 175, 423/176, 177

[56] References Cited
U.S. PATENT DOCUMENTS

| 1,266,730 | 5/1918 | Webster | 423/175 |
| 3,266,788 | 8/1966 | Jukkola | 432/17 |
| 3,522,012 | 7/1970 | Blann | 423/167 |

FOREIGN PATENT DOCUMENTS

| 142,290 | 12/1951 | Australia | 423/659 F |
| 47 of | 1867 | United Kingdom | 423/167 |
| 908,021 | 9/1962 | United Kingdom | 423/167 |

OTHER PUBLICATIONS

Fluidization–Leva–1959–pp. 6–7.
Chemical Engineering Magazine–July 9, 1962–*Where Fluidized Solids Stand Today*–pp. 125–132.

Primary Examiner—O. R. Vertiz
Assistant Examiner—Eugene T. Wheelock
Attorney, Agent, or Firm—Burtsell J. Kearns; Harold M. Snyder

[57] ABSTRACT

Beneficiation of phosphate rock containing limestone is accomplished by calcining, cooling, slaking and separation of the slaked lime from the phosphate rock product. The cooling, slaking and separation operations are conducted in a fluid bed reactor.

7 Claims, 1 Drawing Figure

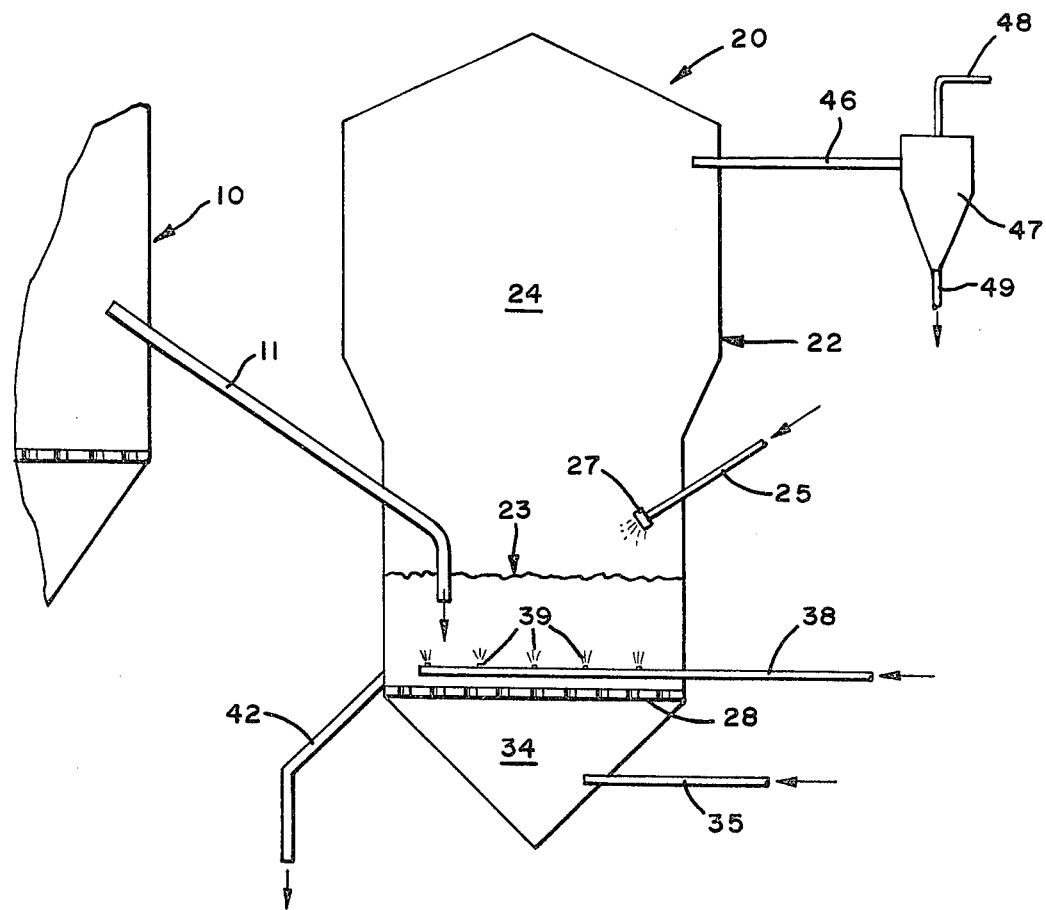

BENEFICIATION OF PHOSPHATE ROCK

This invention is directed to the beneficiation of phosphate rock, and in particular, to the removal of organic and inorganic impurities from such phosphate rocks.

Phosphate rock is mined throughout the world for use in the production of fertilizer and for making other valuable products. In some cases, in the phosphate rock as mined, the phosphorus-containing component is associated with substantial amounts of organic and/or inorganic impurities. Further, as high-grade phosphate rock deposits become exhausted, the lower grade rock deposits with larger amounts of impurities must be utilized. Beneficiation of phosphate rock is therefore widely practiced and, in a first stage, may take the form of washing and concentrating by flotation to remove impurities.

A further stage of beneficiation of phosphate rock involves calcining the rock at an elevated temperature to burn off the organic impurities and/or decompose the calcium carbonate present in occluded form by driving off the $CO_2$ of the carbonate. This is followed by cooling the calcined product, slaking the lime remaining and separating the phosphorus-containing component of the rock from the calcium hydroxide produced by the slaking procedure, whereby the $P_2O_5$ content of the rock product obtained is significantly improved.

However, as presently practiced, the above process for beneficiation of phosphate rock has the disadvantage that additional and separate stages are required for the lime slaking and for separating the calcium hydroxide with a consequent requirement for additional equipment. Also, in some areas adequate quantities of water are not available for slaking. It would clearly be highly desirable if a process were available in which the cooling, slaking and separation of the calcined rock product could be quickly and concurrently accomplished without the necessity for extensive additional equipment.

It is an object of the invention to improve and simplify the operations of cooling, slaking and separating a calcined phosphate rock product.

Other objects and advantages will become apparent from the following description taken in conjunction with the accompanying drawing in which:

The FIGURE is a schematic showing of a fluid bed reactor capable of operating in accordance with the present invention.

Generally speaking, the invention is directed to a process in which a hot calcined rock product is simultaneously cooled, slaked and separated into a first fraction high in phosphate rock product and a second fraction high in calcium hydroxide.

More particularly, a calcined rock product at a temperature of from about 900° F to about 1600° F is fed into a fluid bed reactor unit in which a stream of air flowing through the constriction plate of the reactor maintains the calcined rock product in a fluidized state. Water is sprayed on the fluidized phosphate rock to cool it, while additional water is introduced directly into the fluidized bed to complete slaking of the lime which is present. The water is introduced through a separate line either in liquid form or as steam directly into the fluidized bed through the wall of the reactor. Alternatively, steam may be introduced into the windbox of the fluid bed reactor with the fluidizing air, or it may even entirely replace the fluidizing air. The fluidizing gas passes through the fluidized bed picking up calcium hydroxide which is produced in a relatively fine particle size of −65 mesh or finer and carrying it up and out of the fluid bed reactor, thereby effecting a separation and removal of this impurity.

Referring to the drawing, it will be seen that this system for beneficiation of phosphate rock consists of a fluid bed reactor 20 which is situated to receive a hot calcined product from the phosphate rock calciner 10. A conduit 11 is provided for discharging the calcined rock product from the calciner 10 into the fluid bed reactor 20 to maintain the fluidized bed 23 in the reactor compartment 24 at a predetermined level. A water conduit 25 passes through the wall 22 of the fluid bed reactor to supply a spray head 27 in position to discharge upon the fluid bed 23. The reactor compartment 24 is separated from the windbox 34 in the reactor 20 by a constriction plate 28. A conduit 35 conducts fluidizing gas to the windbox 34. Another conduit 38, suitable for either water or steam, passes through the wall 22 of the reactor 20 to supply nozzles 39 which are positioned below the upper surface of the fluidized bed 23. A conduit 42 is provided for discharging the cooled phosphate rock product from the fluidized bed 23. Conduit 46 is provided for accommodating the off-gases from the chamber 24. Cyclone 47 may be provided into which the conduit 46 discharges and the gaseous and solid fractions separated in the cyclone are conducted from the cyclone by conduits 48 and 49, respectively.

In operation, hot calcined phosphate rock is supplied to the fluid bed reactor 20 through the conduit 11. The water issuing from the sprayhead 25 acts to cool the fluidized bed. It should be evident, however, that this water spray does not penetrate the fluidized bed to any great degree because the temperature of the hot calcines is at a level of, for example, about 1000° F as it comes from the calciner 10 and the water, consequently, flashes to steam even before it strikes the bed. It is the water or steam injected directly into the fluidized bed through the conduit 38, or the steam introduced with or as a fluidizing gas through the windbox 34 which is available for reaction with bed material. This water is in intimate contact with the phosphate rock product throughout the fluidized bed and has ample opportunity to react with the lime associated with the phosphate rock. Accordingly, the slaking reaction occurs, and calcium hydroxide is produced in the fluidized bed. This calcium hydroxide is of a particle size of −65 mesh or less, the fine particle size due, in large measure, to abrasion in the bed. As a result of this fine particle size, the fluidizing gas carries the particles of calcium hydroxide upward through the chamber 24 to the exhaust conduit 46 which conducts the gas stream to the cyclone 47. In the cyclone 47, a further separation occurs with the gases leaving through the conduit 48 for further treatment or to the stack while the calcium hydroxide and dust exit at the apex of the cyclone 47 through the conduit 49 to report as waste.

The hot calcines which entered the fluid bed reactor at a temperature of perhaps 1000° F or higher are discharged through the conduit 42 at a temperature in the range from 200° − 350° F; e.g., about 250° F. In order that the phosphate rock product may be handled conveniently it is necessary to reduce the temperature of the calcines to the ambient. This may be accomplished by employing a further fluidized bed cooler (not shown) equipped with a conventional water spray to produce the desired additional cooling.

For the purpose of illustrating the advantages of the invention to those skilled in the art, the following example is given:

EXAMPLE

A fluid bed reactor unit of the type illustrated in the drawing, having a bed diameter of 10 feet, operates on a feed of about 60 TPH (short tons per hour) of phosphate rock calcines having particle sizes up to −4 mesh. The hot calcines are introduced tnto the fluid bed reactor unit at a temperature of about 500°–600° C (932°–1112° F). The calcines contain about 10–15 % by weight, of CaO. Cooling water is sprayed on the fluidized bed at the rate of 20–30 GPH (Gallons Per Hour) and a fluidizing air stream is introduced through the windbox of the fluid bed reactor at ambient temperature. An additional quantity of water is introduced through a conduit which supplies a plurality of nozzles positioned within the fluidized bed and just above the level of the constriction plate of the fluid bed reactor at the rate of 10–15 GPH. About 55 TPH of beneficiated phosphate rock product is produced at a temperature of about 160°–170° C (320°–338° F) and about 5 TPH of calcium hydroxide having an average particle size of up to −65 mesh is elutriated by the fluidizing gas and obtained as separated waste or by-product. The slaking reaction transforms about 85% of the CaO to calcium hydroxide, and the separation which occurs in the fluid bed reactor is effective to separate about 75% of the calcium hydroxide from the phosphate rock calcines.

It is thus seen that a relatively simple system for simultaneously accomplishing cooling, slaking and separating has been provided whereby a beneficiated phosphate rock product is produced. The quantity of water required is greatly reduced when compared with conventional slaking in which a water slurry is formed for this reaction.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In a fluid bed process for beneficiating phosphate rock containing a substantial amount of calcium carbonate as an impurity, which includes the steps of calcining the phosphate rock thereby driving off $CO_2$ gas and producing a quantity of lime, cooling the calcined rock product, slaking the lime contained therein and separating the slaked lime from the rock product, the improvement comprising conducting the cooling, slaking and separation operations in a fluid bed reactor, including passing a gas stream through a single bed of particulate calcined phosphate rock in said reactor to fluidize the bed and cool the calcined rock, spraying water into the freeboard region of said reactor to cool the calcined rock, injecting water directly into said fluidized bed of calcined rock below the upper surface thereof to obtain an intimate mixture of the water and rock thereby effecting further cooling of the rock and slaking the lime associated therewith, the fluidizing gas effecting elutriation and separation of the slaked lime from the phosphate rock product, removing the gas from the reactor with the elutriated slaked lime entrained therein and disposing of the gas and the solid matter carried thereby.

2. The process of claim 1 wherein at least part of the injected water is in the form of steam.

3. The process of claim 1 wherein the fluidizing gas is air.

4. The process of claim 3 wherein part of the fluidizing air is replaced by steam.

5. The process of claim 1 wherein the fluidizing gas is steam.

6. The process of claim 1 wherein the calcined rock product enters the fluid bed reactor at a temperature of from 900° F to 1600° F and the phosphate rock product is cooled to a temperature in the range from 200° to 350° F.

7. The process of claim 4 wherein the calcined rock product enters the fluid bed reactor at a temperature of from 900° F to 1600° F and the phosphate rock product is cooled to a temperature in the range from 200° to 350° F.

* * * * *